(12) United States Patent
Hasan et al.

(10) Patent No.: US 12,225,087 B2
(45) Date of Patent: Feb. 11, 2025

(54) METHOD AND SYSTEM FOR MANAGING USER INTERACTIONS

(71) Applicant: Quantiphi Inc, Marlborough, MA (US)

(72) Inventors: Asif Hasan, Marlborough, MA (US); Kanishk Mehta, Mumbai (IN); Ankit Arora, Mumbai (IN); Aarzoo Doshi, Mumbai (IN); Jeetha P J, Mumbai (IN); Jyoti Sahoo, Mumbai (IN); Aditya Sharma, Mumbai (IN); Bishwajeet Das, Mumbai (IN)

(*) Notice: Subject to any disclaimer, the term of this patent is extended or adjusted under 35 U.S.C. 154(b) by 0 days.

(21) Appl. No.: 17/934,193

(22) Filed: Sep. 21, 2022

(65) Prior Publication Data

US 2024/0098147 A1  Mar. 21, 2024

(51) Int. Cl.
*H04L 67/141* (2022.01)
*H04L 67/133* (2022.01)
*H04L 69/16* (2022.01)

(52) U.S. Cl.
CPC .......... *H04L 67/141* (2013.01); *H04L 67/133* (2022.05); *H04L 69/16* (2013.01)

(58) Field of Classification Search
CPC ..... H04L 67/133; H04L 67/01; H04L 67/535; H04L 67/10; H04L 67/14; H04L 67/141; H04L 67/56; H04L 9/40; H04L 69/16; H04L 63/08; H04L 63/10; H04L 51/046; H04L 65/1069; H04L 65/1104; H04L 65/1101
See application file for complete search history.

(56) References Cited

U.S. PATENT DOCUMENTS

| 10,412,206 | B1* | 9/2019 | Liang | H04M 3/42068 |
|---|---|---|---|---|
| 10,567,314 | B1* | 2/2020 | Chang | H04M 3/42323 |
| 10,750,000 | B1* | 8/2020 | Adams | G10L 15/30 |
| 11,979,273 | B1* | 5/2024 | Martin | G06F 16/61 |
| 2017/0054770 | A1* | 2/2017 | Wells | H04L 65/65 |
| 2019/0028587 | A1* | 1/2019 | Unitt | G06F 9/453 |
| 2019/0205386 | A1* | 7/2019 | Kumar | G06F 40/30 |

(Continued)

FOREIGN PATENT DOCUMENTS

| CN | 105847041 A * | 8/2016 | |
|---|---|---|---|
| EP | 3413540 A1 * | 12/2018 | G06F 16/3329 |

OTHER PUBLICATIONS

Khalil, et al., published "Phone of Things (PoT) Empowering IoT Systems Through the Ubiquitous Telephone Network Infrastructure and Voice Commands", published in 2021 IEEE 7th World Forum on Internet of Things (WF-IoT), in Jun. 2021, 7 pages.

*Primary Examiner* — Rachel J Hackenberg
(74) *Attorney, Agent, or Firm* — RC Trademark Company

(57) ABSTRACT

Disclosed is a system and method for managing user interactions with a client device. The method comprises receiving from a telecommunication network, connected to the client device, a session request; processing the session request to determine relay information for routing the session request; transmitting the session request to a trained virtual agent based on the relay information, wherein the trained virtual agent is configured to process the session request to generate a command signal; and transmitting the command signal, via a private exchange mechanism, to the client device to establish the session for user interaction, wherein the data transmission between the client device and the trained virtual agent is based on a predefined protocol.

10 Claims, 4 Drawing Sheets

(56) References Cited

U.S. PATENT DOCUMENTS

| | | | | |
|---|---|---|---|---|
| 2019/0362718 A1* | 11/2019 | Bhargava | ............... | G10L 15/22 |
| 2022/0124126 A1* | 4/2022 | Casey | ................. | H04L 67/025 |
| 2023/0403357 A1* | 12/2023 | Ezell | ................. | H04M 3/4283 |

* cited by examiner

METHOD AND SYSTEM FOR MANAGING USER INTERACTIONS

TECHNICAL FIELD

The present disclosure relates generally to automated session management techniques; and more specifically, to a system and a method for managing user interactions with a client device.

BACKGROUND

In recent times, with the recent advancements in Natural Language Processing (NLP) and Artificial Intelligence (AI), chatbots are witnessing a rapid increase in various consumer facing industries. Chatbots are mainly intended to engage customers in a natural and intelligent conversational experience using AI techniques that can mimic a human agent and respond to customers' inquiries quickly and efficiently anytime and anywhere. Moreover, the Internet of Things (IoT) is changing the daily lifestyle of each individual and extends the Internet connectivity beyond just regular computers and smartphones to include everything from household appliances to industrial gadgets, wherein each of which can transmit a plethora of sensed information and other useful data to help make better-informed business decisions.

However, there still exists several problems associated with such systems and methods. The main problems that stem for such systems and methods are private ecosystems, malicious attacks, lack of security. Since each system provides their own ecosystem or infrastructure, most of the underlying protocols and standards of such ecosystems are not compatible with each other and results in the problem that there is no "lingua franca" within each system, which in turn hinders their interoperability. Other problems, include reduced security and privacy of the session beings established for user interaction and so forth.

Therefore, in light of the foregoing discussion, there exists a need to overcome the aforementioned drawbacks associated with techniques for managing user interactions with a client device.

SUMMARY

An object of the present disclosure is to provide a method for managing user interactions with a client device. Another object of the present disclosure is to provide a system for managing user interactions with a client device. The present disclosure provides solutions that overcome at least partially the problems encountered in the prior art.

In an aspect, an embodiment of the present disclosure provides a method for managing user interactions with a client device, comprising:
  receiving from a telecommunication network, connected to the client device, a session request;
  processing the session request to determine a relay information for routing the session request;
  transmitting the session request to a trained virtual agent based on the relay information, wherein the trained virtual agent is configured to process the session request to generate a command signal; and
  transmitting the command signal, via a private exchange mechanism, to the client device to establish the session for user interaction, wherein the data transmission between the client device and the trained virtual agent is based on a predefined protocol.

In yet another aspect, an embodiment of the present disclosure provides a system for managing user interactions with a client device, the system comprising at least one server configured to:
  receive from a telecommunication network, connected to the client device, a session request;
  process the session request to determine relay information for routing the session request;
  transmit the session request to a trained virtual agent based on the relay information, wherein the trained virtual agent is configured to process the session request to generate a command signal; and
  transmit the command signal, via a private exchange mechanism, to the client device to establish the session for user interaction, wherein the data transmission between the client device and the trained virtual agent is based on a predefined protocol.

Embodiments of the present disclosure substantially eliminate or at least partially address the aforementioned problems in the prior art and enable efficient management of user interactions with a client device.

Additional aspects, advantages, features and objects of the present disclosure will be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

DETAILED DESCRIPTION OF EMBODIMENTS

Figure 1A:
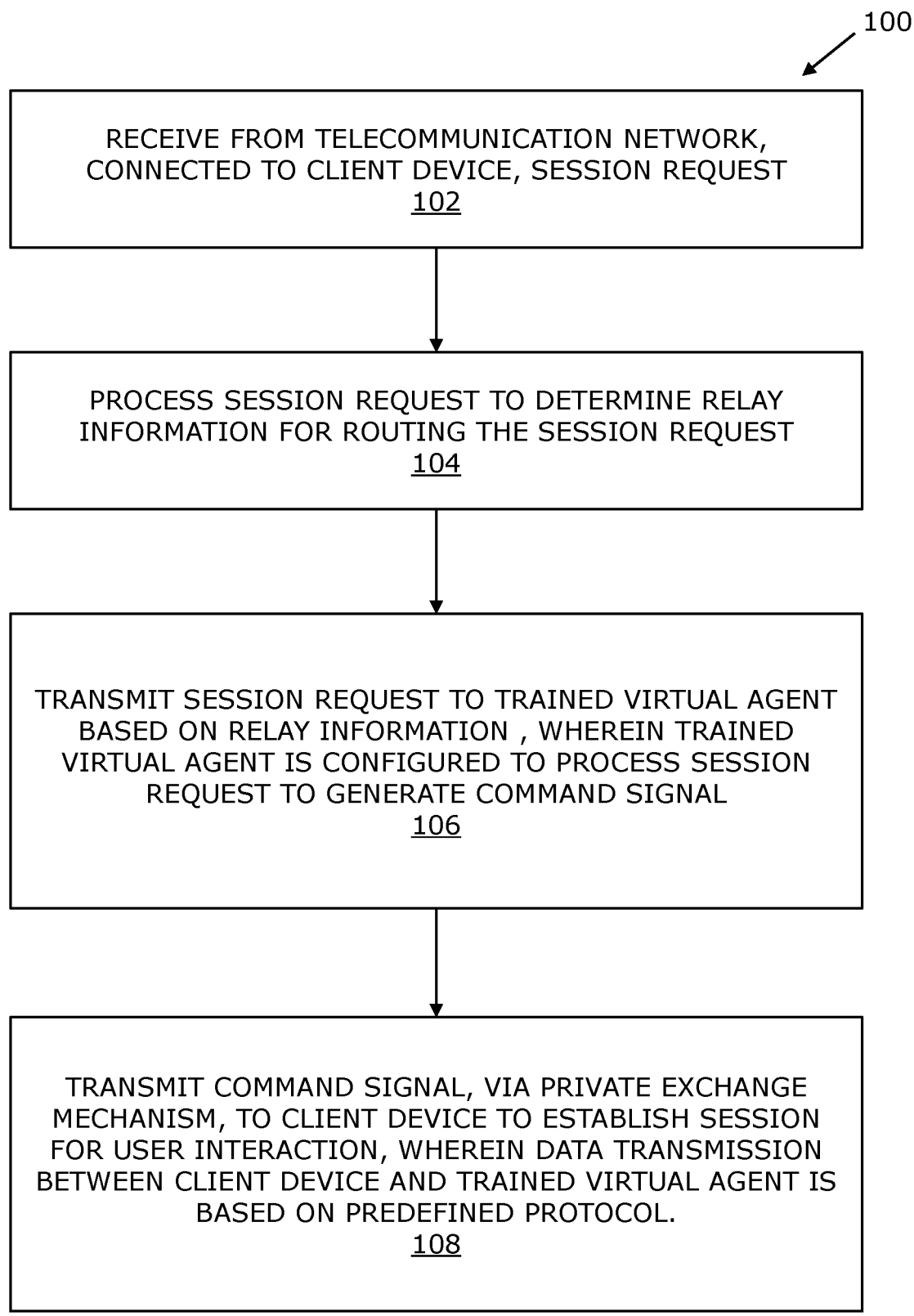
FIG. 1A illustrates a flowchart depicting steps implemented by a method for managing the user interactions with a client device, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In an aspect, an embodiment of the present disclosure provides a method for managing user interactions with a client device, comprising:
receiving from a telecommunication network, connected to the client device, a session request;
processing the session request to determine relay information for routing the session request;
transmitting the session request to a trained virtual agent based on the relay information, wherein the trained virtual agent is configured to process the session request to generate a command signal; and
transmitting the command signal, via a private exchange mechanism, to the client device to establish the session for user interaction, wherein the data transmission between the client device and the trained virtual agent is based on a predefined protocol.

In yet another aspect, an embodiment of the present disclosure provides a system for managing user interactions with a client device, the system comprising at least one server configured to:
receive from a telecommunication network, connected to the client device, a session request;
process the session request to determine relay information for routing the session request;
transmit the session request to a trained virtual agent based on the relay information, wherein the trained virtual agent is configured to process the session request to generate a command signal; and
transmit the command signal, via a private exchange mechanism, to the client device to establish the session for user interaction, wherein the data transmission between the client device and the trained virtual agent is based on a predefined protocol.

The present disclosure provides a method for managing user interactions with a client device. The term "managing" as used herein refers to processing, monitoring or recording, and connection capabilities of the method facilitating the user interactions i.e., between the client device and a desired end-point or end-user. The method is configured to connect client system or device(s) such as, private branch exchanges, telephony systems, contact centers, automatic call distributors, user hubs, or even individual user devices, with at least one desired or associated end-point such as, computer devices, Artificial Intelligence (AI)/Machine learning (ML) driven bots, and the like, to enable seamless peer-to-peer conversations therebetween. Further, the term "client device" refers to a computing environment associated with the client (such as, CPaaS, IP-PBX, CCaaS, SIP Servers, call Management networks, etc.) comprising a combination of hardware, software and/or telecommunications networks or equipment used by the client or a contractor thereof, capable of storing and processing data. For example, the client device may be at least one of server, a computer, a smartphone, a SIP device, a tablet, a phablet, a laptop, a smart watch, an Internet of Things (IoT) device, and the like.

It will be appreciated that the client device being managed via the method is configured based on the SIP protocol and may be referred to as an 'SIP' device; however, in case of a non-SIP device (such as, a smartphone, or smart gadgets), the non-SIP device is made to connect with an SIP device to enable management of the user interactions, associated with the non-SIP client device, via the method.

The present method is configured to manage i.e., establish, maintain and thereafter terminate the session between any user (i.e., the client device) and at least one end-point, wherein the method is based on conventional web-based protocols i.e., SIP, UDP, TCP, gRPC, MQTT to enable integration of VoIP infrastructure and other network infrastructures and beneficially provide enhanced connectivity, security, automation, and monitoring capabilities. The application of the present method is to integrate any SIP-based telephony system into AI-driven natural language understanding (NLU) engine, natural language generation (NLG), or natural language processing (NLP) engine such that customers/callers can have a natural language conversation with the AI rather than the key tone-based DTMF IVR solutions that exist today. Moreover, even if there is no access to internet, the present method is still functionable, accessible, and may be commanded and/or monitored via pre-defined commands such as, via a phone call.

In recent times, Internet of Things (IoT) devices are rapidly emerging and an increasing number of companies have switched to VoIP (Voice over internet protocol). Herein the method, with the implementation of virtual agents integrated into existing IoT, VoIP, and other similar systems enhances the connectivity, accessibility, and interoperability thereof and at the same time reduces the operational costs of the implementation. Currently, companies are either using the legacy telephony systems or have recently upgraded to VoIP. Thus, the integration of VoIP infrastructure via the present method may beneficially provide enhanced connectivity, security, automation, and monitoring capabilities. Moreover, even if there is no access to internet, the present method is still functionable, accessible, and may be commanded and/or monitored via pre-defined commands such as, via a phone call. IoT gadgets may be viewed as a typical SIP (Session Initiation Protocol) endpoint, wherein each IoT gadget may then be registered to an existing unified communication (UC) solution within the premise, assigned a unique phone number, commanded using a phone call, and interacted naturally using intuitive spoken commands and vocal responses. Beneficially, the present method enables elderly, physically, and visually impaired individuals to interact with state-of-the-art products naturally without clicks or complicated graphical user interfaces (GUIs).

The method comprises receiving from a telecommunication network, connected to the client device, a session request. Herein, the method is configured to receive the session request from the telecommunication network associated and/or connected with the client device for establishing a session therebetween. The term "session request" refers to a type of data request to enable initiation or establishment of the communication session between the client device and the virtual agent. For example, an invite message comprising session parameters, audio stream, etc. Herein, the session request comprises characteristic information of the client device that enables the method to authenticate or whitelist, and thereby establish the session therebetween. For example, the session request comprises authentication information in the form of connection credentials associated with the client device system such as, client's communication platform as a service (CPaaS), contact center as a service (CCaaS), IP Branch exchange (IP-PBX), SIP Server, communication solutions, and the like. Additionally, the session request may further comprise authentication information including, but not limited to, SIP address, DNS ID, internet protocol (IP) address, a media access control (MAC) address associated with the client device, or the client SBC associated therewith, configuration information, client query, and the like. Typically, massive amounts of data are exchanged across worldwide networks in real-time, wherein SIP routing leverages these transmissions to allow a client or device thereof to establish direct connections for Voice-over Internet Protocol (VoIP) and allows multi-media communication to be exchanged across the internet via cloud-based telecommunication systems. However, before a session may be established i.e., for an incoming or outbound call may be processed, the session request comprising the client query messages are exchanged via a session border controller (SBC) associated with the client device or the client device network (for e.g., client SIP infrastructure). Optionally, the client query may include an OPTIONS message to allow the present method to provide the allowed capabilities to the SBC. Such an implementation allows the client device to query another client device or the trained virtual agent or a proxy thereof, regarding its capabilities. Notably, such a client query exchange is important for OPTIONS negotiation to be successful (i.e., to receive a 200 or an OK response), allowing for further communication and for the session to be established. Such an implementation allows a client or client device to discover information about the supported methods, extension content types with or without a session being established.

As used herein, the term "telecommunication network" (also simply referred to as network) refers to a group of interconnected nodes used to exchange data or messages therebetween. The interconnections between the nodes are typically used by a variety of technologies based on the method of circuit switching, message switching, or packet switching, to pass messages and signals in order to provide seamless peer-to-peer conversations. Herein, the telecommunication network may be configured to enable the method may communicate with each element (or node) therein. The telecommunication network includes a medium (e.g., a network) through which the elements communicate with each other. Examples of the telecommunication network include, but are not limited to, a network in a computer cluster, a Local Area Network (LAN), a cellular network or a telephony system, a wireless sensor network (WSN), a cloud network, a Metropolitan Area Network (MAN), TCP/IP network, and/or the Internet. Optionally, the telecommunication network comprises one or more of a wired connection, a wireless network, cellular networks such as 2G, 3G, 4G, 5G mobile networks, and a Zigbee connection. Beneficially, such an implementation allows to dispense the traditional telephone network infrastructure within the premises, and hence reducing both the installation and maintenance costs. Besides, telephone calls over the Internet are almost cost-free, since individuals and enterprises would not pay more than their regular Internet connection fees. As a result, large enterprises can leverage the use of the Internet to make phone calls to all their remote branches with no additional costs.

In one or more embodiments, the session request comprises one or more of: a client query and a client device ID. Herein, the term "client query" refers to a type of data query comprising multiple data packets associated with the client device or the client itself. The client query comprises at least one of a text, an audio stream, or a video stream. For example, the client query may include client device certifications, information from the client in the form of text, audio or video, and the like. The term "client device ID" refers to the unique identification information associated with the client device. In an example, the client device ID may be an IP address of the client device. In another example, the client device ID may be the device identification string such as, the IMEI number. It will be appreciated that any form of client device identification may be used to identify the client, the client device, location of the client device and the like, to accurately identify and thereby verify each client device during operation without limiting the scope of the present disclosure.

In one or more embodiments, the method comprises authenticating, the session request based on one or more of the client query and the client device ID. The present method authenticates the session request to improve the security and reliability of the session, and thereby prevents potential malicious attacks. The term "authenticating" as used herein refers to a process of identifying and verifying the identity of a client device or the client in a secure manner; for example, client identity verification, client device verification, client location verification and the like. Additionally, the present method may include client device (or terminal) identification in order to automatically authenticate future connections initiated from a specific location or computer equipment. Herein, an identifier in, or attached to, the client device is verified to indicate whether the session request should be allowed or not and based on which, the client (or user) may be granted access to the session, or restricted to a set of specific terminals for logging into a specific system, e.g., only one main terminal in an entire client network. Moreover, to ensure the effectiveness of such an implementation, the present method may further encrypt the session using a defined encryption means in order to maintain the security of the client device identifier.

In one or more embodiments, the session request is derived from a Public Switched Telephone Network (PSTN) of the telecommunication network. The term "PSTN" refers to the traditional circuit-switched telephone network and comprises of all the switched telecommunication networks around the world that are operated by local, national or international entities, wherein the PSTN is configured to provide the infrastructure and services for public telecommunication. In an exemplary scenario, the client device may initiate a call (or session) by dialing a number, wherein the session resides in the PSTN of the telecommunication network. Beneficially, the inclusion of traditional telecommunication networks increases the interoperability and accessibility and allows the client to beneficially employ the trained virtual agents without the need of additional hardware and thereby reduces the operational costs of the implementation of the present method. It will be appreciated that such a limitation is based on a non-SIP client device i.e., required to be connected to an SIP device for management via the method and otherwise, any SIP device may directly utilize the method of the present disclosure without any limitations.

The method further comprises processing the session request to determine relay information for routing the session request. Upon receiving the session request, the method further comprises processing the session request to determine the relay information required for routing the session request. The processing of the session request enables the method to validate or whitelist the associated client device (or system) and at the same time, enables identification of an associated end-point for further relay of information. Typically, the method validates the session request using the incoming Credentials part of that incoming session request based on information pre-stored in a verified credentials database. Further, the method is configured to identify the trained virtual agent i.e., the NLU endpoint, since the method allows for multiple CPaaS providers (i.e., SIP session origin) to interact with their respective trained virtual agents and thereby transmitting the session request to the trained virtual agent (via a RTP server) via the predefined MQTT protocol. Herein, the authentication information obtained from the session request is processed to determine the relay information. The term "relay information" refers to information associated with an end-point (such as, the trained virtual agent) to which the session is being established with. For example, the relay information comprises authentication information, identification information, operation (or command) information, and/or location information of the end-point i.e., trained virtual agent. As discussed, massive amounts of data are exchanged across worldwide networks in real-time, wherein SIP routing leverages these transmissions to allow a client or device thereof to establish direct connections for Voice-over Internet Protocol (VoIP) and allows multi-media communication to be exchanged across the internet via cloud-based telecommunication systems. However, before a session may be established i.e., for an incoming or outbound call may be processed, the session request comprising the client query messages are exchanged via a session border controller (SBC) associated with the client device (or network). For example, the client device (such as, a SIP device) locates and transmits the session request (i.e., an invite) to another node (i.e., the end-point) within the network. The end-point acting as the recipient then replies with a 200-response code i.e., the equivalent of an "OK" to establish the session. Similarly, such an operation takes place simultaneously at the client device end, thereby enabling connection and transfer of information via the client device or the end-point. In another exemplary implementation, the client query comprises at least one of a SIP address, a routing number (such as, direct inward dialing number) associated with an end-point; based on which the method may further route the session request to the associated end-point.

The method further comprises transmitting the session request to a trained virtual agent based on the relay information, wherein the trained virtual agent is configured to process the session request to generate a command signal. Typically, upon determining the relay information for routing the session request, the session request is transmitted to a trained virtual agent (or the end-point) based on the determined relay information. Herein, upon receiving the session request, the trained virtual agent is configured to process the session request to generate the command signal. For example, the trained virtual agent may process the audio stream present in the session request to determine an intended operation from the client or the client device. Further, based on the determined intended operation, the trained virtual agent is configured to generate a corresponding command signal. The term "command signal" refers to a type of signal generated by the trained virtual agent in response to the client query or session request. In an example, the command signal comprises further routing of the session to another device or end-point. In another example, the command signal comprises controlling a connected device to perform the connected device operation such as, activating or deactivating a modern air conditioner, an IoT device, a client device, and the like. In another example, the command signal comprises transmitting the session request to an external server for further processing.

As used herein, the term "virtual agent" refers to a trained artificially intelligent agent software program (also referred to as an intelligent virtual agent (IVA), or chatbot), trained via natural language processing (NLP), configured to employ a set of scripted codes, rules, and artificial intelligence applications to perform a plurality of operations. For example, some common trained virtual agents are Google Assistant®, Alexa®, Siri®, Cortana®, any other NLU/NLP agents, and the like. Herein, the trained virtual agent may be configured to perform a pre-trained operation based on the processed session request including, but not limited to, conversing with humans, processing data, performing sentiment analysis, understanding behavioral patterns, providing recommendations and/or guidance, etc. It will be appreciated that the virtual agent may be connected with other hardware and firmware components including, but not limited to, memory, processor(s), network interface, and other components that may be required for the implementation of the present method. Additionally, the virtual agents may be trained to autonomously (or semi-autonomously) interpret human language to enable efficient peer-to-peer conversations with humans to effectively provide the required assistance or guidance.

Further, the term "human language" (also referred to as natural language) refers to any language that has evolved naturally in humans through use and repetition without conscious planning or premeditation. Examples of natural language include, English, Spanish, Hindi, French, German, Cantonese, Mandarin, Russian, and so forth. Optionally, natural language may take on different forms, for example, textual, speech, or signing (i.e., signage). Optionally, the present method executes a machine learning model capable of implementing at least one natural language processing algorithm, for processing the raw conversation data. Beneficially, the trained virtual agents improve user experiences and increase productivity by automating tasks including translation, transcription, recording, record management, action management, and the like. Moreover, the trained virtual agent may be re-trained dynamically in order to learn and adapt to user preferences and improve the effectiveness thereof.

Optionally, the method may be configured to determine a trained virtual agent suitable for the intended operation based on the client query of the session request. For example, the text or audio stream in the session request may comprise information indicative of the operation to be performed by the trained virtual agent, and thereby the method may correspondingly route the session request to a virtual agent trained for the indicated operation. Such an implementation improves the accuracy and effectiveness of the operation and thereby increases the reliability and effectiveness of the present method. In another exemplary implementation, the client query may comprise an audio stream comprising raw conversation data, wherein the present method may be configured to process the audio stream to determine the relay information. Optionally, the raw conversation data is in form of a natural language, and wherein the raw conversation data comprises at least one of: information pertaining to intents of client, information pertaining to skills of virtual agents, device-identification information (DII), and the like.

In one or more embodiments, the trained virtual agent implements a general-purpose Remote Procedure Call (gRPC) endpoint configured to process a client query to generate the command signal. The "gRPC end-point" refers to an end-point associated with a gRPC framework i.e., a modern open-source high-performance Remote Procedure Call (RPC) framework that can run in any network environment. The gRPC endpoint may be a distributed API management system that provides an API console for hosting, logging, monitoring, and other features to enable the method to create, share, maintain, and secure the RPC APIs. For example, the gRPC endpoints are applicable in the last mile of distributed computing to connect devices, mobile applications, and browsers to backend services. Moreover, the gRPC end-point comprises a machine learning NLU front-ended by the gRPC API, that processes the client query and returns structured, actionable data as a result which is sent back to the origin SIP endpoint (or the client device) via any exchange mechanism. Herein, once the session is connected to the gRPC API endpoint of the virtual agent, the session is established between the SIP endpoint of the telephony system and the virtual agent. Beneficially, the gRPC endpoint may efficiently provide connectivity services in and across data centers with pluggable support for load balancing, tracing, health checking, and authentication.

The method further comprises transmitting the command signal, via a private exchange mechanism, to the client device to establish the session for user interaction, wherein the data transmission between the client device and the trained virtual agent is based on a predefined protocol. Herein, upon generating the command signal via the trained virtual agent, the method further comprises transmitting the command signal to the client device via the private exchange mechanism to establish the session for user interaction. The term "predefined protocol" refers to a pre-selected internet protocol i.e., a network layer communications protocol for relaying datagrams across network boundaries. The predefined protocol is used for the routing function to enable internetworking within the telecommunication network and establish a session between any two end-points. For example, the predefined protocol may be one of gRPC, MQTT, TCP, IP, User Datagram Protocol (UDP), and the like. Herein, the "private exchange mechanism" refers to a private network (or PBX) that enables the users to communicate with each other securely. The private exchange mechanism is employed to establish the session between the client device and the trained virtual agent based on the predefined protocol. It will be appreciated that the predefined protocol may be varied based on the needs of the implementation to improve the efficiency thereof. Beneficially, the private exchange mechanism enables to manage and terminate the session on a pre-defined schedule, transfer session calls between users, connecting multiple location securely and the like.

In an exemplary implementational scenario of the method, a session request is received from a client device (such as, an SIP Device), or a client system such as, an SIP service provider (for example, CPaaS, CCaaS, IP-PBX, etc.) via the method. Upon receiving the session request, the method is configured to process the session request based on the received information in the session request i.e., the authentication credentials associated with the client device or client system, via the SIP protocol. Moreover, during such processing (or validation), the method is further configured to identify an associated trained virtual agent based on the processed session request i.e., to identify the correct NLU endpoint (e.g., NLU virtual-agent). Once the client device is validated or authenticated based on the processed session request, the method is configured to transmit the session request to an RTP server configured to establish an audio streaming session between the client device or client system and the trained virtual agent via the predefined protocol (i.e., the gRPC protocol). Once the session is established, the end-user (i.e., associated with the client device or system) is able to have an interactive voice session with the trained virtual agent (e.g., NLU virtual-agent).

In one or more embodiments, the private exchange mechanism implements Inter-Asterisk eXchange (IAX). The private exchange mechanism implements the IAX or the Asterisk exchange mechanism (or simply 'Asterisk'). The "Asterisk exchange mechanism" refers to an open-source and Linux-based framework for building feature-rich telephony applications and comprises hybrid time division multiplexing (TDM) and packet voice PBX. Typically, the Asterisk private exchange mechanism comprises of different loadable modules, wherein each module is responsible for a specific functionality. Such modules include the application modules which encompass the dial-plan functions that define how the session are routed through the system, the channel driver modules which define supported interfaces and act as gateways to the Asterisk core, and the codec translator modules which are responsible for the conversion of audio streams from one format to another. Beneficially, the Asterisk enables IP PBX systems, VoIP gateways, conference servers, and other custom solutions. Moreover, Asterisk is fully customizable and can be tailored to respond to external events. Moreover, the private exchange mechanism comprises its own scripting language to configure its operation, and may still be programmed through the use of Asterisk Gateway Interface (AGI) using conventional high-level programming languages such as Python, Pearl, Java, C++, PHP, and Node.js.

In one or more embodiments, the predefined protocol is User Datagram Protocol (UDP). With UDP, computer applications can send messages, in this case, referred to as datagrams, to other hosts on an Internet Protocol (IP) network and wherein prior communications are not required in order to set up networks or data paths. Notably, existing methods involve usage of Transmission Control Protocol (TCP) protocol; however, the method of the present disclosure may be configured to employ the UDP to transfer audio content over the telecommunication network. Beneficially, such an implementation is faster and allows broadcasting as well. UDP audio/RTP (Real-Time Protocol) received on asterisk and using the External Media application in the Asterisk Rest Interface (ARI) of the private exchange mechanism is further piped to the trained virtual agents, and vice-versa.

In one or more embodiments, the predefined protocol is Session Initiation Protocol (SIP). The term "SIP" refers to a signaling protocol used for initiating, maintaining, and terminating real-time sessions that include voice, video, and messaging applications. Session Initiation Protocol (SIP) is a session protocol that enables mobility at the application layer, wherein the SIP employs a Universal Resource Identifier (URI) to represent the user (or client device) identity connected to a SIP domain. The session thus established, therefore, are bound to the URI and not to an IP address. On mobility events, the client device sends a binding update message that renews the mapping in the SIP server (i.e., URI to IP address). The SIP specifications define an architecture of user agents and servers (proxy server, redirect server, register) that support communications between SIP peers through user tracking, call routing, and so on. Herein, each user is uniquely identified by an SIP universal resource indicator, which is used as the identifier to address the called end-point during session request initiation. As the communication proceeds, the URI is used to identify the user during the entire session. In an example, a typical session in SIP begins with a user sending an INVITE message to a peer through SIP proxies. When the recipient accepts the request and the initiator is notified, the actual data flow begins, usually taking a path other than the one taken by the SIP signaling messages. An INVITE message typically carries a description of the session parameters. In particular, each media component of the SIP session is described in terms of QoS parameters. Additionally, the client device or the trained virtual agent may modify the parameters regarding an existing session by adding or removing media components or modifying the current QoS using a re-INVITE message.

In one or more embodiments, the predefined protocol is Message Queuing Telemetry Transport (MQTT) protocol. The MQTT protocol refers to a standard messaging protocol for the Internet of Things (IoT). It is designed as an extremely lightweight publish/subscribe messaging transport that is ideal for connecting remote devices with a small code footprint and minimal network bandwidth and used in a wide variety of industries, such as automotive, manufacturing, telecommunications, oil and gas, etc.

In one or more embodiments, the method further comprises terminating the session request based on a session end request from either the trained virtual agent or the client device. The method is further configured to terminate the session based on any input from either end-point i.e., the client device or the trained virtual agent or once the user-interaction is complete. Optionally, the method may be further configured to terminate the session based on a termination time period for the session till which session is established or session is terminated if no data transmission takes place for 't' seconds. For example, the termination time period ranges from 10 seconds to 10 minutes. In another example, the termination time period ranges from 15 minutes to 60 minutes.

Moreover, the present disclosure also relates to the system as described above. Various embodiments and variants disclosed above apply mutatis mutandis to the system.

In another aspect, an embodiment of the present disclosure provides a system for managing user interactions with a client device, the system comprising at least one server configured to:
  receive from a telecommunication network, connected to the client device, a session request;
  process the session request to determine relay information for routing the session request;
  transmitting the session request to a trained virtual agent based on the relay information, wherein the trained virtual agent is configured to process the session request to generate a command signal; and
  transmit the command signal, via a private exchange mechanism, to the client device to establish the session for user interaction, wherein the data transmission between the client device and the trained virtual agent is based on a predefined protocol.

Herein, the 'server' refers to a structure and/or module that includes programmable and/or non-programmable components configured to store, process and/or share information and/or signals for managing user interactions with a client device. For example, Kamailio® server, Asterisk™ server, etc. The server may be a controller having elements, such as a display, control buttons or joysticks, processors, memory and the like. Typically, the server is operable to perform one or more operations for detecting the at least one entity in the document. In the present examples, the server may include components such as memory, a processor, a network adapter and the like, to store, process and/or share information with other computing components, such as a client device, a remote server unit, a remote gateway, a network, or a database.

Optionally, the server includes any arrangement of physical or virtual computational entities capable of enhancing information to perform various computational tasks. Further, it will be appreciated that the remote server may be implemented as a hardware server and/or plurality of hardware servers operating in a parallel or in a distributed architecture. Optionally, the server is supplemented with additional computation system, such as neural networks, and hierarchical clusters of pseudo-analog variable state machines implementing artificial intelligence algorithms. In an example, the server may include components such as a memory, a data communication interface, a network adapter and the like, to store, process and/or share information with other computing devices, such as the client device, a user device.

Optionally, the server is implemented as a computer program that provides various services (such as database service) to other devices, modules or apparatus. Moreover, the server refers to a computational element that is operable to respond to and processes instructions for managing user interactions with a client device. Optionally, the server includes, but is not limited to, a microprocessor, a microcontroller, a complex instruction set computing (CISC) microprocessor, a reduced instruction set (RISC) microprocessor, a very long instruction word (VLIW) microprocessor, Field Programmable Gate Array (FPGA) or any other type of processing circuit, for example as aforementioned.

The present disclosure also provides a computer-readable storage medium comprising instructions which, when executed by a computer, cause the computer to carry out the steps of the method for managing the user interactions. Examples of implementation of the non-transitory computer-readable storage medium include, but is not limited to, Electrically Erasable Programmable Read-Only Memory (EEPROM), Random Access Memory (RAM), Read Only Memory (ROM), Hard Disk Drive (HDD), Flash memory, a Secure Digital (SD) card, Solid-State Drive (SSD), a computer readable storage medium, and/or CPU cache memory. A computer readable storage medium for providing a non-transient memory may include, but is not limited to, an electronic storage device, a magnetic storage device, an optical storage device, an electromagnetic storage device, a semiconductor storage device, or any suitable combination of the foregoing.

DETAILED DESCRIPTION OF DRAWINGS

Referring to FIG. 1, illustrated is a flowchart illustrating steps involved in a method 100 for managing user interactions with a client device, in accordance with an embodiment of the present disclosure. As shown, the method 100 comprises the steps 102, 104, 106, 108.

At a step 102, the method 100 comprises receiving from a telecommunication network, connected to the client device, a session request. The session request comprising the authentication information, and optionally other characteristic information, is received from the telecommunication network based on a first predefined protocol (i.e., SIP protocol). All the requests that arrive is via CPaaS/CCaaS provider or any system/device that is capable of performing SIP Trunking, SIP Integration using SIP protocol.

At a step 104, the method 100 further comprises processing the session request to determine relay information for routing the session request. Upon receiving the session request, the method (via the server such as, Kamailio® and/or Asterisk™) initiates validation of the session request, wherein the method validates the authentication credentials part of the incoming session request based on pre-stored information (such as, stored in an SQL database). When session request(s) arrives and it is authenticated, Kamailio forwards it to Asterisk. If the destination is online/available, Asterisk will send the call back to Kamailio since the contact of destination is Kamailio. Then Kamailio will do location lookup and send confirmation to destination. Additionally, the processing of the session request further comprises identification of a trained virtual agent i.e., NLU endpoint to determine the relay information.

At a step 106, the method 100 further comprises transmitting the session request to a trained virtual agent based on the relay information, wherein the trained virtual agent is configured to process the session request to generate a command signal. Upon processing, the session request, the method is further configured to transmit the session request to the trained virtual agent via a RTP server. Further, the method is configured to establish an active audio-streaming connection at the required virtual-agent running a virtual NLU agent, using a second predefined protocol (i.e., the gRPC protocol)

At a step 108, the method 100 further comprises transmitting the command signal, via a private exchange mechanism, to the client device to establish the session for user interaction, wherein the data transmission between the client device and the trained virtual agent is based on a predefined protocol.

It will be appreciated that the process steps of FIG. 1A can be an iterative process for each incoming session request. The method is capable of supporting multiple CPaaS providers or system/device that is capable of performing SIP Trunking, SIP Integration using SIP protocol (SIP session request origin) to interact with their own NLU endpoints or virtual agents simultaneously.

Figure 1B:
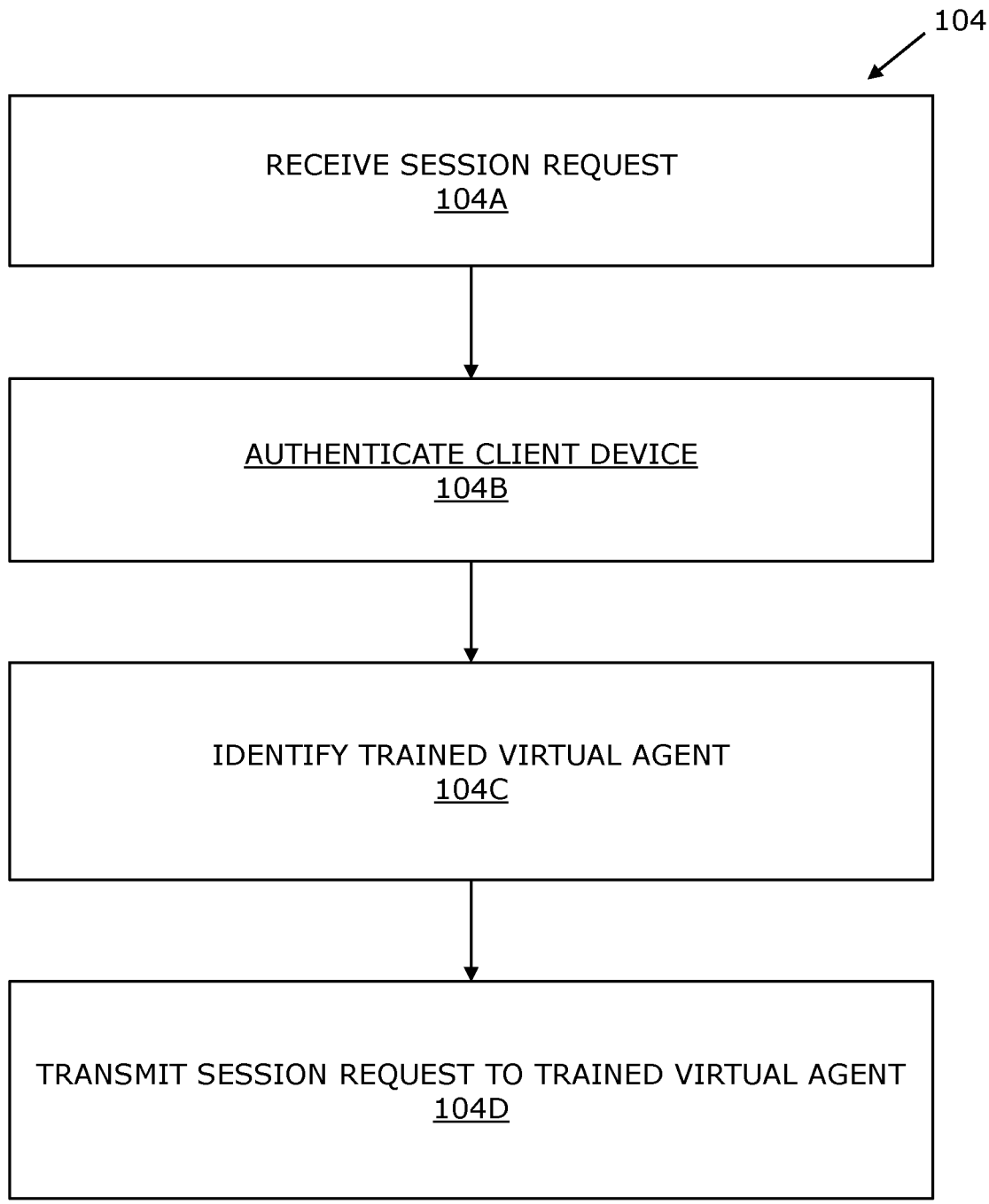
FIG. 1B illustrates a flowchart depicting sub-steps implemented by the processing step of the method of FIG. 1A, in accordance with embodiments of the present disclosure.

Referring to FIG. 1B, illustrated is a flowchart depicting steps involved in the processing step 104 of the method 100 of FIG. 1A, in accordance with embodiments of the present disclosure. As shown, the method 100 comprises step 104 that includes processing the session request to determine relay information for routing the session request. At a step 104A, the method 100 comprises receiving the session request comprising the authentication information associated with the client device or a client system such as, via CPaaS provider, or any system or device capable of performing SIP Trunking and SIP Integration. At a step 104B, method 100 is configured to validate the session request using the incoming credentials part of the incoming session request based on pre-stored verified credentials database. The authentication information received along with the session request associated with the client system is compared with a database pre-stored with valid credentials. Based on the comparison the incoming session request is either validated or the session request terminated. At a step 104C, the method 100 is further configured to identify the trained virtual agent (i.e., the NLU endpoint, since the method allows for multiple CPaaS providers (i.e., SIP session origin) to interact with their respective trained virtual agents. For e.g. the session request may comprise text or audio stream in the session request. This text or audio stream may comprise information which can be used while identifying the trained virtual agent. Further the audio stream can be processed to determine a context or intent of the conversation, which can then be used to identify the trained virtual agent. And, at a step 104D, the method further comprises transmitting the session request to the trained virtual agent (via a RTP server) via a predefined MQTT protocol.

Figure 1C:
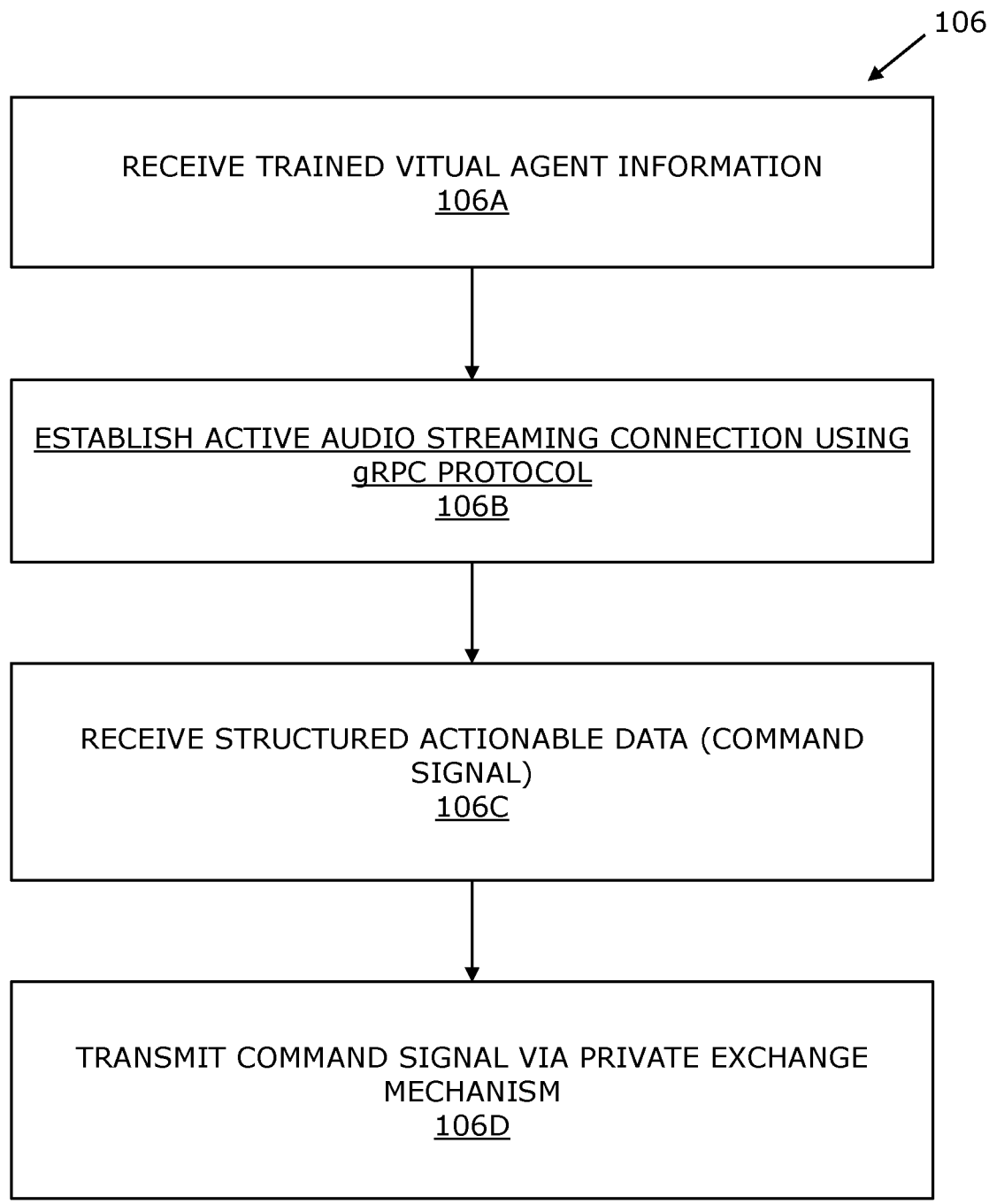
FIG. 1C illustrates a flowchart depicting sub-steps implemented by the transmit session request steps of the method of FIG. 1A in accordance with the embodiments of the present disclosure.

Referring to FIG. 1C, illustrated is a flowchart depicting steps involved in the transmitting session request step 106 of the method 100 of FIG. 1A, in accordance with embodiments of the present disclosure. As shown, the method 100 comprises step 106 that includes transmit session request to trained virtual agent based on relay information, wherein trained virtual agent is configured to process session request to generate command signal. At a step 106A, the method 100 comprises receiving the trained virtual agent information (via a RTP server) via a predefined MQTT protocol. The trained virtual agent is front ended by a general-purpose Remote Procedure Call (gRPC) endpoint (API) that is configured to process a client query. At a step 10613, the method 100 comprises establishing an active audio streaming call connection between the SIP Device or SIP Service provider and NLU endpoint or virtual agent endpoint. At a step 106C, the method 100 comprises receiving structured, actionable data as a result of establishing an active audio streaming call connection This is called a command signal. At a step 106D, the method 100 comprises transmitting the command signal to the SIP device or SIP service provider, via a private exchange mechanism. The SIP device or SIP service provider can connect to the call using the command signal. Once the call is connected, it allows the SIP device or SIP provider (end-user) to be able to have an active voice-interaction with the NLU endpoint or virtual agent endpoint.

Figure 2:
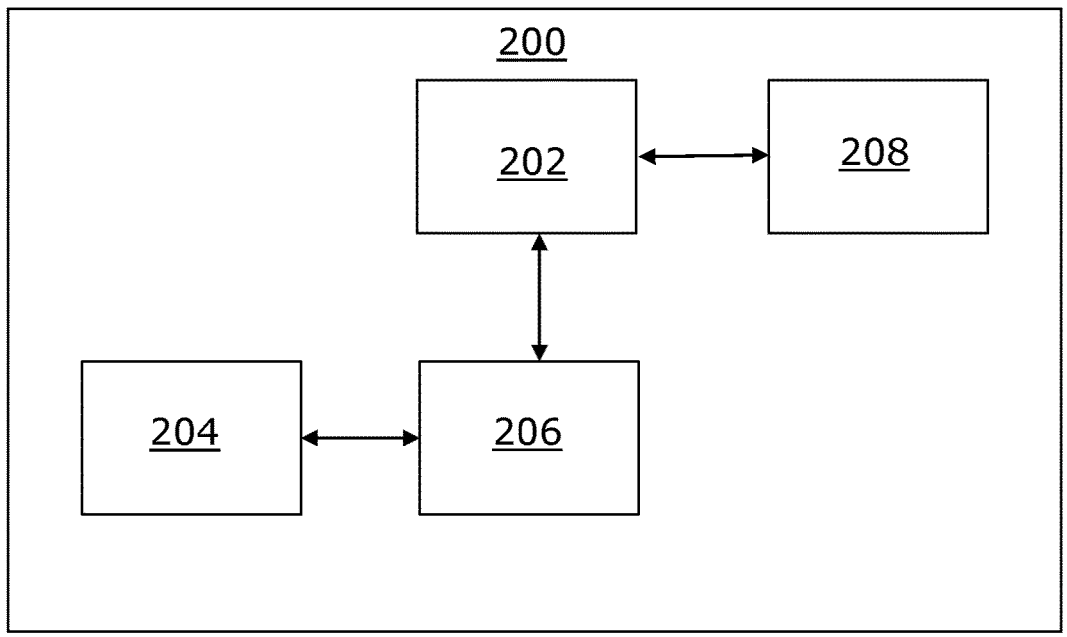
FIG. 2 illustrates a block diagram of a system for managing the user interactions with a client device, in accordance with an embodiment of the present disclosure.

Referring to FIG. 2, illustrated is a block diagram of a system 200 for managing user interactions with a client device 204, in accordance with an embodiment of the present disclosure. As shown, the system 200 comprises at least one server 202 configured to receive from a telecommunication network 206, connected to the client device 204, a session request. Further, the at least one server is configured to process the session request to determine relay information for routing the session request. Furthermore, the server 202 is further configured to transmit the session request to a trained virtual agent 208 based on the relay information, wherein the trained virtual agent 208 is configured to process the session request to generate a command signal. Furthermore, the server 202 is configured to transmit the command signal, via a private exchange mechanism, to the client device 204 to establish the session for user interaction, wherein the data transmission between the client device 204 and the trained virtual agent 208 is based on a predefined protocol.

Figure 3:
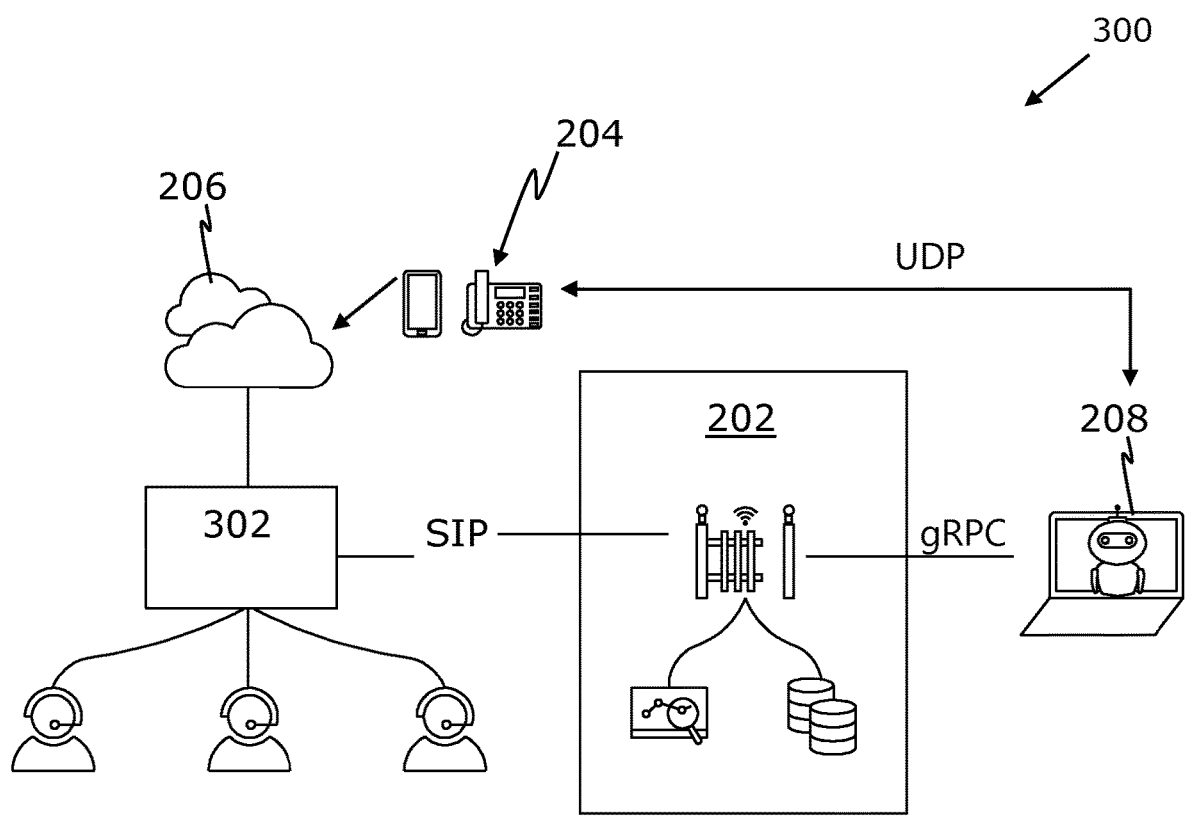
FIG. 3 illustrates a schematic diagram of a system for managing the user interactions with a client device, in accordance with an embodiment of the present disclosure.

Referring to FIG. 3, illustrated is a schematic diagram of an exemplary system 200 for managing user interactions with a client device 204 implementing a telephony system 302, in accordance with an embodiment of the present disclosure. As shown, the client device 204 is connected to the telecommunication network 206 for initiating the session. The telecommunication network 206 is connected to the telephony system 302 (such as, contact centers, service helplines, etc.). The client via the client device 204 is configured to dial in a number and the session will be routed to the telecommunication network 206, wherein the session resides in the PSTN of the telecommunication network. Herein, a first predefined protocol i.e., the SIP protocol initiates the session to the server 202 and wherein the session is forwarded to the server 202 in the form of an audio stream over the predefined SIP protocol in form of SIP packets. Further, upon receiving the session request from the server 202, the session request is processed to be internally validated and thereby routed, over a second predefined protocol i.e., the MQTT protocol, to a gRPC endpoint (i.e., an RTP server) of a trained virtual agent 208 to establish the session using the third predefined protocol i.e., the gRPC protocol. Further, wherein the trained virtual agent 208 is front-ended by the gRPC API that processes the natural language query and returns structured, actionable data as a result which is sent back to the origin SIP endpoint via the private exchange mechanism (such as, asterisk or IAX). Conventionally, TCP protocol has been used in other solutions; however, the system 200 uses a fourth predefined protocol i.e., UDP to transfer audio content over the internet which is faster and allows broadcasting in real-time. Once the session request is transferred to the gRPC API endpoint of the virtual agent 208 to the SIP endpoint, the session is established between the SIP endpoint of the telephony system and the trained virtual agent 208, wherein the data transfer between the client device 204 and the trained virtual agent 208 takes place over the fourth predefined protocol i.e., the UDP protocol. Moreover, towards the end of the conversation, the first predefined protocol i.e., the SIP Protocol may be responsible to terminate the session.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A method for managing user interactions with a client device, the method comprising:
    receiving from a telecommunication network, connected to the client device, a session request;
    processing the session request to determine a relay information for routing the session request;
    transmitting the session request to a trained virtual agent based on the relay information, wherein the trained virtual agent is configured to process the session request to determine an intended operation from the client device, wherein the trained virtual agent is configured to generate a command signal based on the determined intended operation from the client device, and wherein the trained virtual agent is trained dynamically to learn and adapt to user preferences; and
    transmitting the command signal, via a private exchange mechanism, to the client device to establish a session for user interaction, wherein the data transmission between the client device and the trained virtual agent is based on a predefined protocol, and wherein the session request comprises characteristic information of the client device for authenticating and establishing the session therebetween,
    wherein the private exchange mechanism comprises loadable modules that are responsible for specific functionalities,
    wherein before the session is established, the session request comprising at least one client query message is exchanged via a session border controller associated with the client device,
    wherein the method is further configured to execute a machine learning model capable of implementing at least one natural language processing algorithm, and
    wherein the method is further configured to terminate the session based on a termination time period for the session till which the session is established or the session is terminated if no data transmission takes place for 't' seconds.

2. The method according to claim 1, wherein the predefined protocol is one of a User Datagram Protocol (UDP), a Session Initiation Protocol (SIP).

3. The method according to claim 1, wherein the predefined protocol is Message Queuing Telemetry Transport (MQTT) protocol.

4. The method according to claim 1, wherein the private exchange mechanism implements Inter-Asterisk eXchange (IAX).

5. The method according to claim 1, wherein the session request comprises one or more of a client query and a client device ID.

6. The method according to claim 5, further comprising authenticating the session request based on one or more of the client query and the client device ID.

7. The method according to claim 1, wherein the trained virtual agent implements a general-purpose Remote Procedure Call (gRPC) endpoint configured to process a client query to generate the command signal.

8. The method according to claim 1 further comprising terminating the session request based on a session end request from either the trained virtual agent or the client device.

9. The method according to claim 1, wherein the session request is derived from a Public Switched Telephone Network (PSTN) of the telecommunication network.

10. A system for managing user interactions with a client device, the system comprising at least one server, and wherein the at least one server comprises a processor configured to:
    receive from a telecommunication network, connected to the client device, a session request;
    process the session request to determine relay information for routing the session request;
    transmit the session request to a trained virtual agent based on the relay information, wherein the trained virtual agent is configured to process the session request to determine an intended operation from the client device, wherein the trained virtual agent is configured to generate a command signal based on the determined intended operation from the client device, and wherein the trained virtual agent is trained dynamically to learn and adapt to user preferences; and
    transmit the command signal, via a private exchange mechanism, to the client device to establish a session for user interaction, wherein the data transmission between the client device and the trained virtual agent is based on a predefined protocol, and wherein the session request comprises characteristic information of the client device for authenticating and establishing the session therebetween,
    wherein the private exchange mechanism comprises loadable modules that are responsible for specific functionalities,
    wherein before the session is established, the session request comprising at least one client query message is exchanged via a session border controller associated with the client device,
    wherein the processor is further configured to execute a machine learning model capable of implementing at least one natural language processing algorithm, and
    wherein the processor is further configured to terminate the session based on a termination time period for the session till which the session is established or the session is terminated if no data transmission takes place for 't' seconds.

* * * * *